United States Patent [19]

Brinkmann et al.

[11] Patent Number: 4,910,422
[45] Date of Patent: Mar. 20, 1990

[54] ELECTROMAGNETIC DEVICE WITH LOW REMANENCE

[75] Inventors: Karl-Ernst Brinkmann; Bernd L. Assmann, both of Barntrup, Fed. Rep. of Germany

[73] Assignee: K. Ernst Brinkmann Industrieverwaltung, Barntrup, Fed. Rep. of Germany

[21] Appl. No.: 150,523

[22] Filed: Jan. 29, 1988

[30] Foreign Application Priority Data

Feb. 27, 1987 [DE] Fed. Rep. of Germany ....... 3706400

[51] Int. Cl.$^4$ ............................ H02K 1/06; H01F 3/10
[52] U.S. Cl. ......................................... 310/77; 310/78; 310/256
[58] Field of Search ................ 310/77, 172, 254, 256, 310/91, 93, 76, 78, 268; 335/279

[56] References Cited

U.S. PATENT DOCUMENTS 3,633,139  4/1970  Thompson .......................... 335/279
4,751,417  6/1988  Krinikas, Jr. et al. .............. 310/211

FOREIGN PATENT DOCUMENTS 3605586  8/1987  Fed. Rep. of Germany ........ 310/93
59-85431  6/1984  Japan .

Primary Examiner—Patrick R. Salce
Assistant Examiner—D. L. Rebsch
Attorney, Agent, or Firm—Michael J. Striker

[57] ABSTRACT

An electromagnetic device such as an electromagnetic brake or an electromagnetic coupling comprises an electromagnet, at least two parts arranged so that, when the electromagnet is switched on, a magnetic flux extends through the parts. Formations reducing residual magnetism in the parts, including a plurality of gaps formed as slots, are provided in at least one of the parts, such that this part remains a one-piece member.

13 Claims, 3 Drawing Sheets

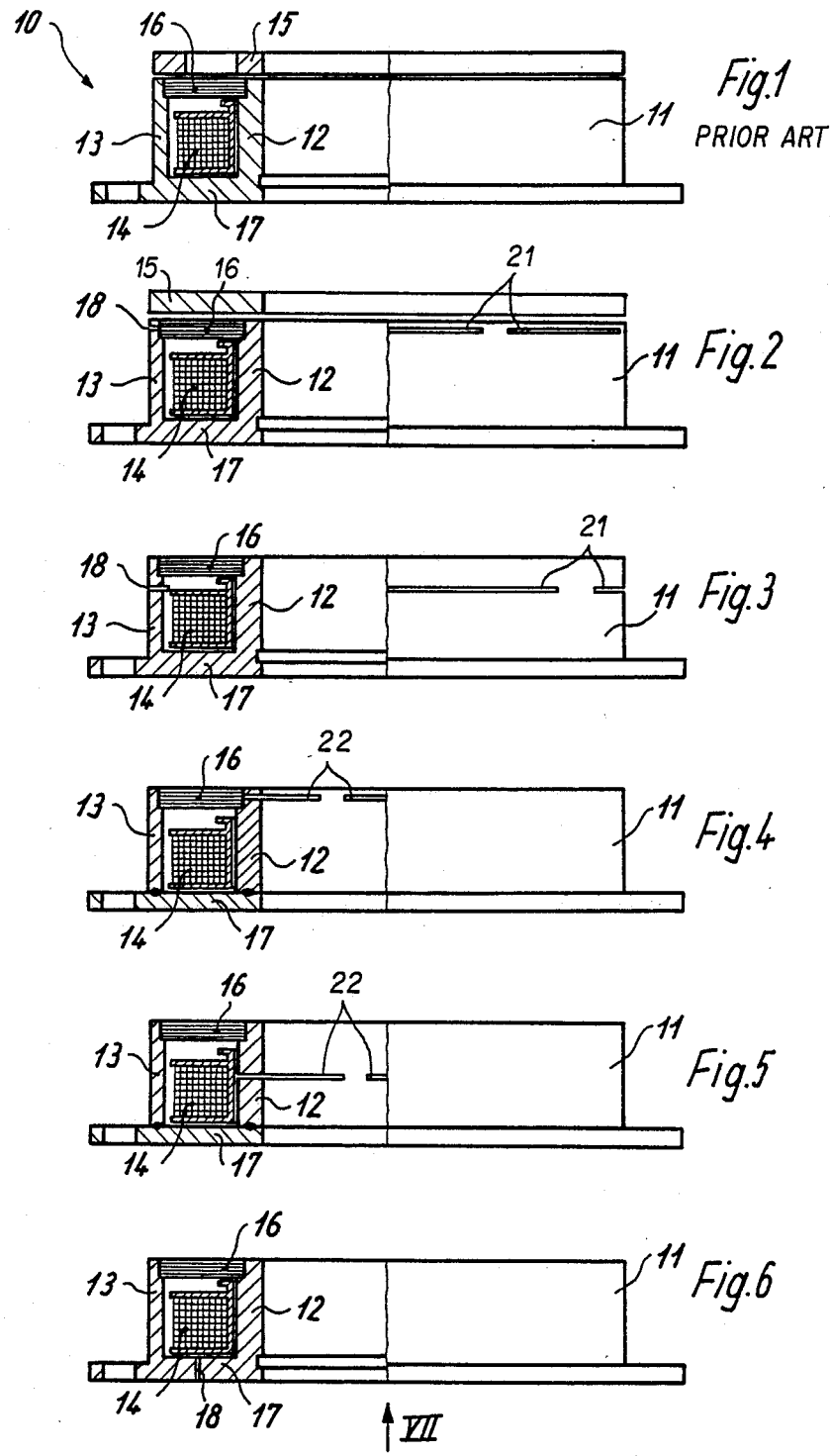

ELECTROMAGNETIC DEVICE WITH LOW REMANENCE

BACKGROUND OF THE INVENTION

The present invention relates to an electromagnetic device such as for example an electromagnetic brake, an electromagnetic coupling and the like, provided with means for reducing a residual magnetism in respective parts of the device.

It is known to provide an electromagnetic brake or coupling which has a magnet housing with inner and outer pole rings, an electromagnets between the rings, and an axially movable armature disc.

In the case of a brake, the armature disc is attracted upon switching on of the electromagnet, to an end surface of the housing, which preferably is provided with a friction coating. In the case of a coupling, the armature disc is attracted to an end surface of a rotor, which is preferably provided with a friction coating. Electromagnetic brakes or electromagnetic couplings of this type are known in the art. The permanent magnetism reducing means is formed as small gaps provided in respective parts of the electromagnetic device and extending perpendicularly to the magnetic flux. Since these gaps reduce the residual magnetism, a reliable and fast release of the armature disc after switching off of the electromagnet is achieved. Therefore, shorter switching times can be obtained in the respective electromagnetic devices.

In the known electromagnetic devices the gaps for the above-mentioned purpose are formed so that in the region of the magnet housing and/or the armature disc, multi-part constructions are provided. For example, the inner pole ring or the outer pole ring of the magnet housing is axially subdivided into a plurality of parts which are then connected with one another with provision of a respective gap. It is also known to provide a recess in the region of the armature disc, in which a separate ring is inserted with interposition of a foil and connected with the remaining part of the armature disc. For example, the Japanese patent No. 5985931 discloses a two-part armature with one air gap between its two parts. The multi-part constructions are considerably expensive, especially in view of the manufacturing costs.

SUMMARY OF THE INVENTION

Accordingly, it is an object of the present invention to provide an electromagnetic device, such as an electromagnetic brake, an electromagnetic coupling and the like, in which the gaps for reducing residual magnetism are provided with minimum manufacturing expense.

In keeping with these objects and with others which will become apparent hereinafter, one feature of the present invention resides, briefly stated, in an electromagnetic device in which one of its parts through which magnetic flux passes, for example, a magnet housing and/or an armature disc is provided with gaps formed as slots which are cut in this part, so that this part remains a one-piece member.

When the electromagnetic device is designed in accordance with the present invention, a considerable cost reduction is obtained, while preserving the same effective operation of the device.

Both the magnet housing and the armature disc can be formed as one-piece structural members by simple cutting of the desired slots so that the residual magnetism is considerably reduced. The costs involved in cutting of the slots are considerably lower than the costs for producing multi-part constructions which involve many working steps for forming the gaps.

It is especially advantageous when the cuts are made by a laser beam in the magnet housing and/or the armature disc, since the laser beam cutting is extremely fast on the one hand, and extremely accurate on the other hand.

The slots can be arranged radially in the region of the inner pole ring and/or the outer pole ring of the magnet housing. Also, the slots can extend axially in the bottom of the magnet housing or in the armature disc.

When the electromagnetic device is an electromagnetic coupling provided with a rotor housing, it is known to provide axially extending openings which, however, serve for almost complete interruption of the magnetic flux in the region of the openings for insuring a desired path of the magnetic flux. For this reason the openings are relatively large for providing the above-mentioned deliberate interruption of the magnetic flux. These openings are not comparable with the slots in the present invention, since these openings have nothing to do with the present invention, because the axial openings of the rotor housing of the prior art serve a totally different purpose, and perform a totally different function.

In contrast, in accordance with the present invention narrow slots are formed for example in the rotor of the electromagnetic coupling, which slots are formed so that they do not interrupt the magnetic flux. The slots are formed so narrow that they exclusively reduce the residual magnetism after switching off of the electromagnet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing an electromagnetic brake in accordance with the prior art in a semi-section;

FIGS. 2-6 are views showing an electromagnetic device, such as an electromagnetic brake or electromagnetic coupling, in accordance with several embodiments of the invention;

DESCRIPTION OF THE PREFERRED EMBODIMENTS

Figure 7:
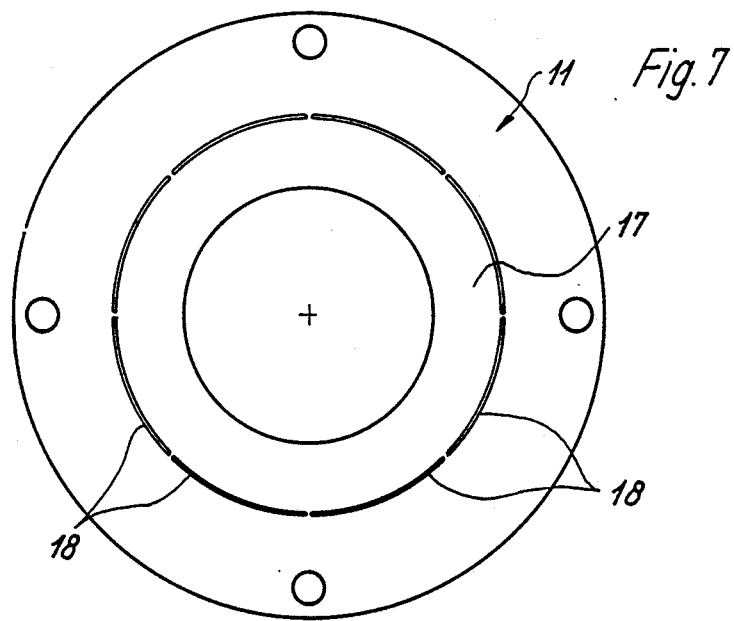
FIG. 7 is a plan view of the electromagnetic device of FIG. 6 as seen in direction of the arrow VII.

An electromagnetic brake 10 shown in FIG. 1 has a magnet housing 11 which has an inner pole ring 12 and an outer pole ring 13. An electromagnet 14 is accommodated in the magnet housing 11. The magnet housing 11 has a bottom 17 at its one end.

A rotating armature disc 15 is associated with the other end of the magnet housing 11. When the electromagnet 14 is switched on, the armature disc 15 is pulled to the end surface of the magnet housing 11. The magnet housing 11 is preferably provided with a known friction coating 16.

When the electromagnet 14 is switched on, a magnetic flux is formed. The magnetic flux extends through the inner pole ring 12, the armature disc 15, the outer pole ring 13, as well as the bottom 17 of the magnet housing 11.

For substantially reducing the residual magnetism after switching off of the electromagnet 14 and therefore releasing the brake in a fast and reliable manner, gaps are provided inside the magnet housing 11 and/or the armature disc 15. These gaps are retained relatively small to avoid interruption of the magnetic flux.

FIGS. 2–6 show possible embodiments of the gaps in the region of the magnet housing 11.

In accordance with the embodiment of FIG. 2, the gaps are formed in the magnet housing 11 by radially extending slots 21 which are cut in the outer pole ring 13. The slots 21 are formed near the end surface, on which the armature disc 15 abuts during switching on of the electromagnet 14.

It is to be understood that the slots 21 must be interrupted over the periphery of the outer pole ring 13 to insure the mechanical integrity of the outer pole ring 13.

In the embodiment of FIG. 3, the slots 21 are also formed in the region of the outer pole ring 13. However, they are substantially offset from the end surface which carries the friction coating 16. Here also the radially extending slots 21 are interrupted over the periphery of the outer pole ring 13 many times.

FIGS. 4 and 5 show further embodiments in which the slots 22 are provided in the region of the inner pole ring 12 and extend radially.

In the magnetic housing shown in FIG. 4 the arrangement of the slots is made so that the slots 22 are located near the end surface, on which the armature disc 15 abuts when the electromagnet 14 is switched on. In the embodiment of FIG. 5, the slots 22 are substantially offset from this end surface.

In the embodiment of FIG. 6 the slots 18 are located in the region of the bottom 17 of the magnet housing 11. These slots extend in an axial direction.

As can be seen from FIG. 7, in the construction shown in FIG. 6 the slots 18 are interrupted at several points. Therefore a complete separation of the bottom 17 of the magnet housing 11 is prevented.

FIGS. 8–11 show the embodiments in which the slots 18 for reducing the residual magnetism after switching off of the electromagnet 14 are provided in the armature disc 15. It can also be seen from FIGS. 8–11 that there are several possibilities for providing the slots 18 in the armature disc.

Figure 8:
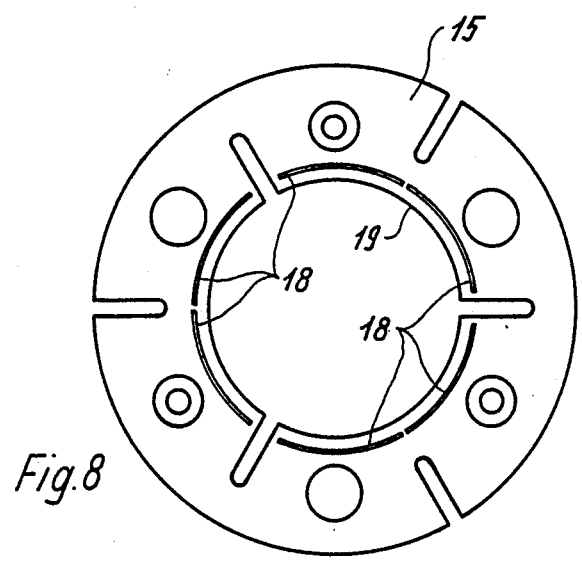
FIGS. 8-11 are plan views of the electromagnetic device in accordance with further embodiments of the invention.

The armature disc 15 in the embodiment shown in FIG. 8 has the slots 18 which are arranged near an inner opening 19 of the armature disc and extend concentrically to the inner opening. These axially extending slots 18 are interrupted many times to maintain the integrity of the armature disc 15.

Figure 9:
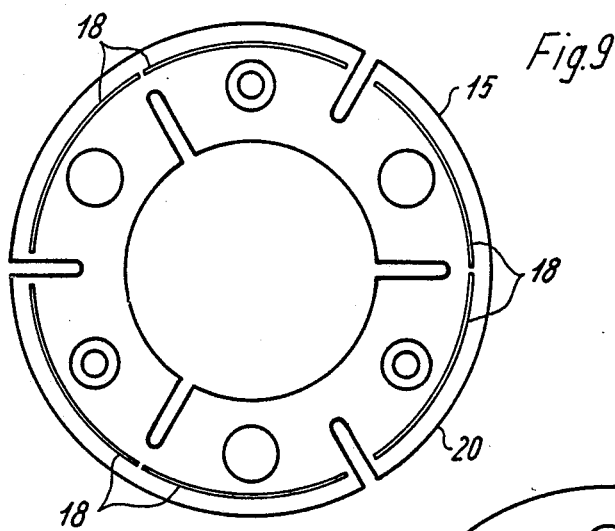

The same is true for the embodiment of FIG. 9. In this embodiment the slots 18 are located near an outer edge 20 of the armature disc 15.

Figure 10:
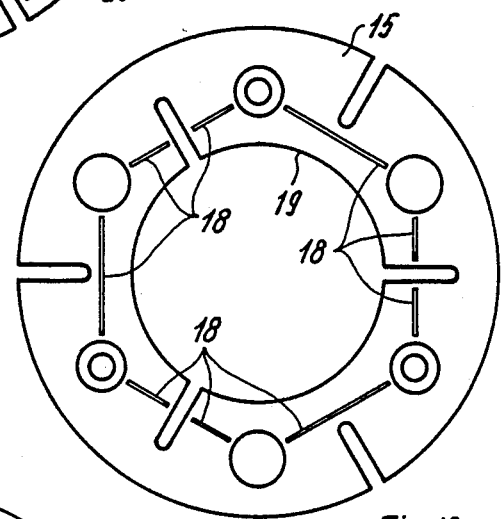

In the embodiment of FIG. 10 the armature disc 15 is provided with straight slots 18. They are interrupted many times and surround the inner opening 19 of the armature disc in the shape of a polygon.

Figure 11:
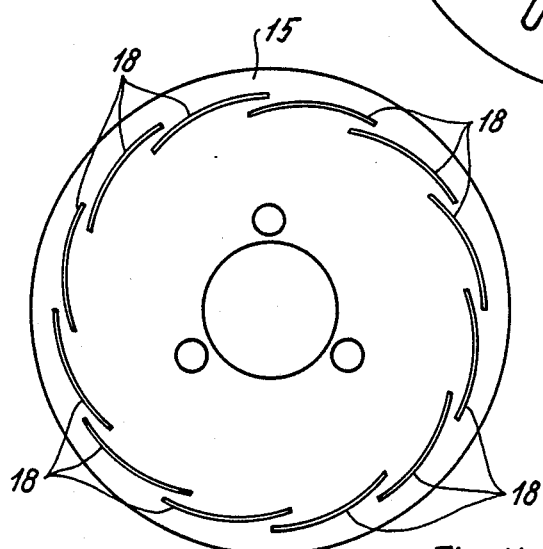

In the embodiment of FIG. 11, the slots 18 are arcuately curved and arranged near the outer edge 20 of the armature disc 15. It can be further seen from FIG. 11 that the curved slots 18 overlap one another without completely interrupting the integrity of the armature disc 15. It can be understood that the shown embodiments illustrate the arrangement and design of the slots 18 with various possibilities. In other words, a designer can form the slots 18 for each specific application with such arrangement and shape of the slots which is most suitable for the respective application.

The slots 18 can be advantageously produced by laser beam cutting process. With the use of this process any complicated shape or arrangement of slots 18 does not cause any problem and does not cause any substantial expense, especially as compared with the prior art.

The invention has been illustrated as embodied in an electromagnetic brake having the magnet housing 11 and the armature disc 15.

It is to be understood tat the invention is also suitable for electromagnetic couplings in which a rotor is arranged between the magnet housing and the armature disc. In the electromagnetic coupling, the magnet housing, the armature disc and the rotor can be provided with slots in the same manner as described hereinabove.

For a magnetic coupling it is advantageous to provide the armature disc or the rotor with the above-mentioned slots since between the magnet housing and the rotor no air gap must be available for structural reasons.

It will be understood that each of the elements described above, or two or more together, may also find a useful application in other types of constructions differing from the types described above.

While the invention has been illustrated and described as embodied in an electromagnetic device, such as an electromagnetic brake, an electromagnetic coupling and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnetic device comprising a magnet housing having an inner pole ring, an outer pole ring, and an end surface having a friction coating thereon; an actuatable electromagnet located between said inner and outer pole rings; an axially movable armature disc which is attracted to said end surface of said magnet housing when said electromagnet is actuated and a magnetic flux extends through said magnet housing and said armature disc; and means for reducing residual magnetism in said magnet housing and said armature disc upon deactuation of said electromagnet, at least one of said magnet housing and said armature disc being formed as a one-piece member, said residual magnetism reducing means comprising a plurality of slots formed in said one-piece member.

2. An electromagnetic device comprising an actuatable electromagnet; at least two parts through which a magnetic flux extends upon actuation of said electromagnet; means for reducing residual magnetism in said two parts, one of said two parts being a one-piece member, said residual magnetism reducing means comprising a plurality of slots formed in said one-piece member, and a third part through which the magnetic flux extends, one of said two parts being a magnet housing having an inner pole ring and an outer pole ring, the other of said two parts being an armature disc, and said third part being a rotor rotatable between said armature disc and said magnet housing.

3. An electromagnetic device as claimed in claim 2, wherein said rotor has an end surface having a friction coating thereon, said armature disc being attracted to said end surface of said rotor upon actuation of said electromagnet.

4. An electromagnetic device comprising an actuatable electromagnet; at least two parts through which a magnetic flux extends upon actuation of said electromagnet; and means for reducing residual magnetism in said parts, one of said two parts being a one-piece member, said residual magnetism reducing means comprising a plurality of slots formed in said one-piece member, said one-piece member being an armature disc having an axis, said plurality of slots comprising concentric slots extending in a plane which is perpendicular to the armature disc axis, said armature disc having an inner opening and said concentric slots being located near said inner opening.

5. An electromagnetic device comprising an actuatable electromagnet; at least two parts through which a magnetic flux extends upon actuation of said electromagnet; and means for reducing residual magnetism in said parts, one of said two parts being a one-piece member, said residual magnetism reducing means comprising a plurality of slots formed in said one-piece member, said one-piece member being an armature disc having an axis, said plurality of slots comprising concentric slots extending in a plane which is perpendicular to the armature disc axis, said armature disc having an outer edge, said concentric slots being located near said outer edge.

6. An electromagnetic device comprising an actuatable electromagnet; at least two parts through which a magnetic flux extends upon actuation of said electromagnet; and means for reducing residual magnetism in said parts, one of said two parts being a one-piece member, said residual magnetism reducing means comprising a plurality of slots formed in said one-piece member, said one-piece member being an armature disc having an axis, said plurality of slots comprising rectilinear slots extending in a plane which is perpendicular to the armature disc axis, said armature disc having an inner opening, said rectilinear slots forming a polygon surrounding said inner opening.

7. An electromagnetic device comprising an actuatable electromagnet; at least two parts through which a magnetic flux extends upon actuation of said electromagnet; and means for reducing residual magnetism in said parts, one of said two parts being a one-piece member, said residual magnetism reducing means comprising a plurality of slots formed in said one-piece member, said one-piece member being an armature disc having an axis, said plurality of slots comprising curved slots extending in a plane which is perpendicular to the armature disc axis, and having end regions which insignificantly overlap one another.

8. An electromagnetic device comprising a magnet housing having an inner pole ring and an outer pole ring; an actuatable electromagnet located between said inner and outer pole rings; an armature disc axially movable relative to said magnet housing when said electromagnet is actuated and a magnetic flux extends through said magnet housing and said armature disc; and means for reducing residual magnetism at least in one of said magnet housing and said armature disc upon deactuation of said electromagnet, said at least one of said magnet housing and said armature disc being formed as a one-piece member, said residual magnetism reducing means comprising a plurality of slots formed in said one-piece member and extend transverse to the magnetic flux.

9. An electromagnetic device according to claim 8, wherein said one-piece member is said magnet housing which has an axis, said slots being provided in said outer pole ring of said magnet housing and extending in a plane which is perpendicular to the magnet housing axis.

10. An electromagnetic device according to claim 8, wherein said one-piece member is said magnet housing which has an axis, said slots being provided in said inner pole ring of said magnet housing and extending in a plane which is perpendicular to the magnet housing axis.

11. An electromagnetic device according to claim 8, wherein said one-piece member is said magnet housing which has a bottom and an axis, said slots extending through said bottom parallel to the magnet housing axis.

12. An electromagnetic device according to claim 8, wherein said one-piece member is said armature disc which has an axis, said plurality of slots extending in said armature disc parallel to the armature disc axis.

13. An electromagnetic device according to claim 8, wherein said slots are laser beam cutting-produced slots.

* * * * *